May 21, 1957
L. W. BURCH ET AL
2,793,270
THERMO-RESPONSIVE ACTUATOR
Filed March 31, 1954
2 Sheets-Sheet 1
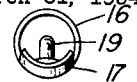
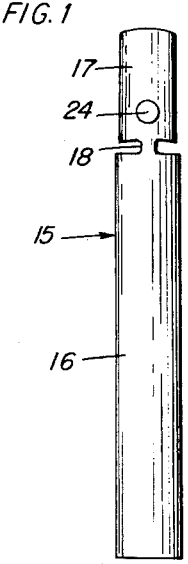
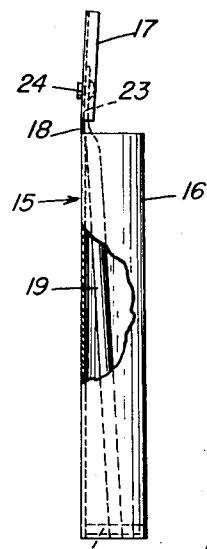
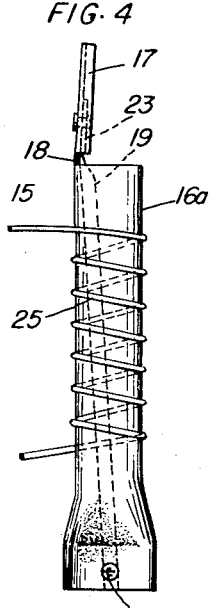
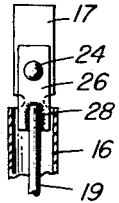
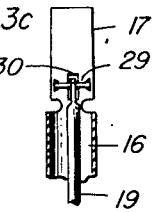
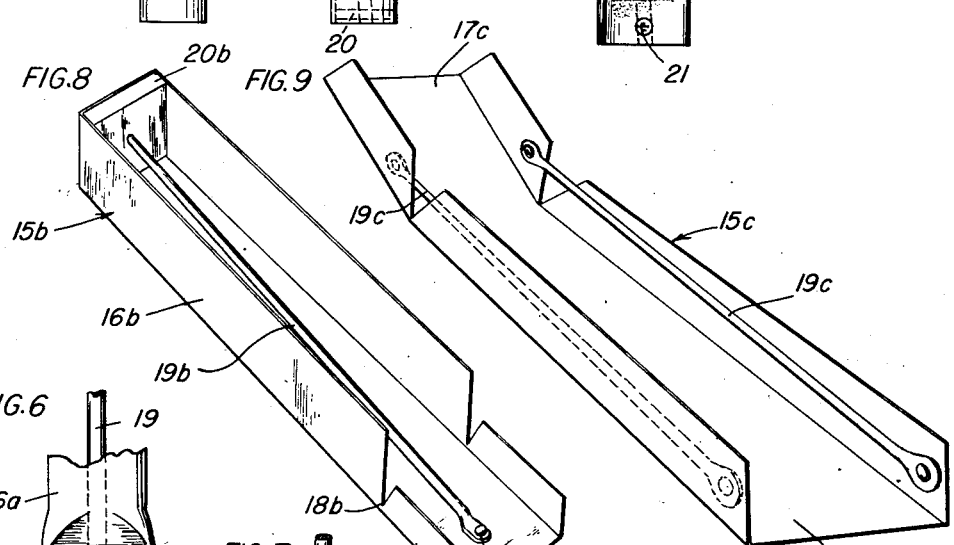
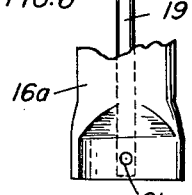
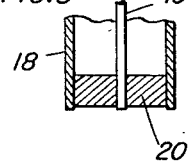
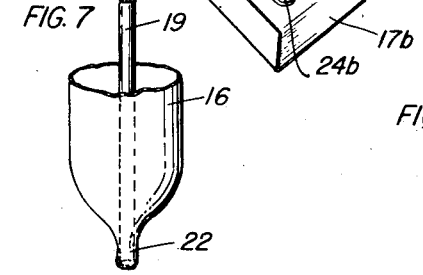
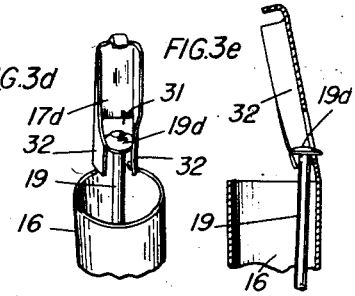
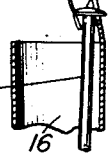

May 21, 1957
L. W. BURCH ET AL
2,793,270
THERMO-RESPONSIVE ACTUATOR
Filed March 31, 1954
2 Sheets-Sheet 2
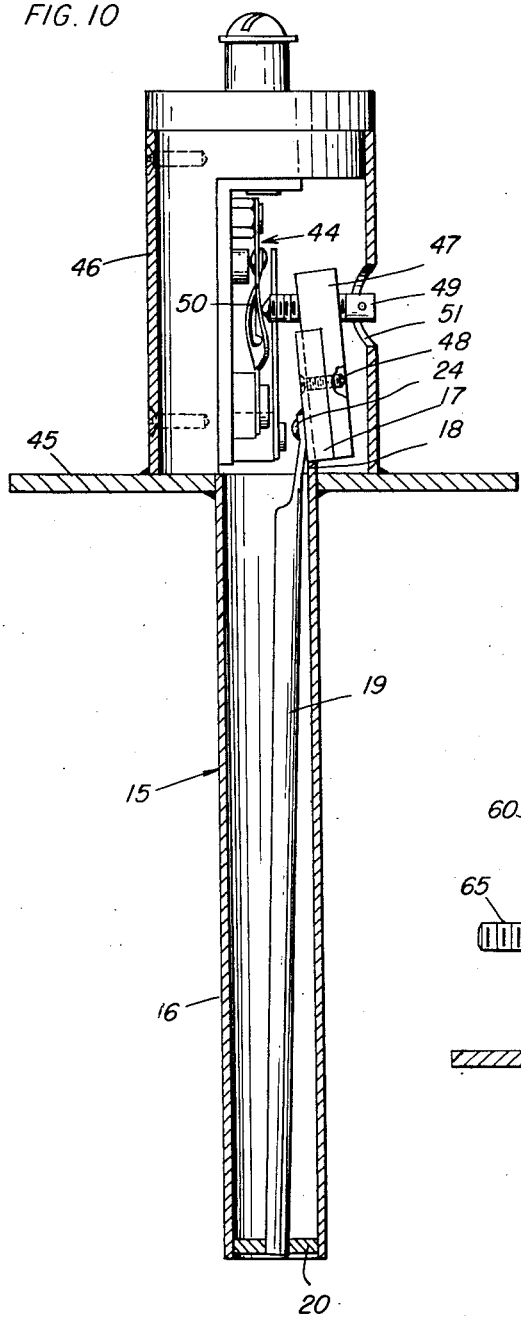
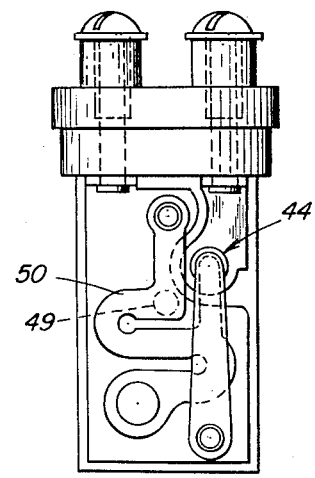
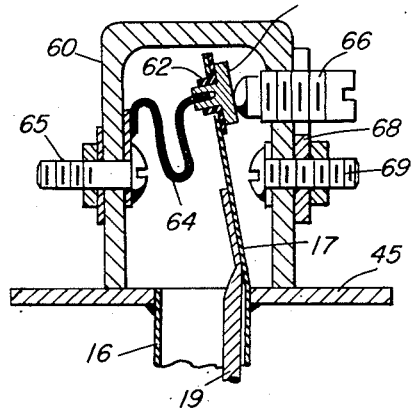
INVENTORS.
Lyndon W. Burch
Hadley K. Burch
By Churchill, Rich, Weymouth & Engel
Attorneys United States Patent Office 2,793,270
Patented May 21, 1957

2,793,270

THERMO-RESPONSIVE ACTUATOR

Lyndon W. Burch, New York, N. Y., and
Hadley K. Burch, Danbury, Conn.

Application March 31, 1954, Serial No. 420,064

18 Claims. (Cl. 200—137)

This invention relates to a thermal actuator, and more particularly a thermo-responsive, differential expansion actuator. The invention is especially useful in its application to apparatus for operating a switch or an indicator movable over a scale, to which use, however, it is not restricted.

Various types of thermo-responsive, differential expansion actuators are well known. Such apparatus is generally unduly complicated and expensive, is usually dependent upon an undesirable number of interacting parts, may require a train of elements to amplify the movement of its primary parts, may change its calibration with use, and may call for frequent adjustment and extensive maintenance.

The present invention provides a simple, inexpensive, thermo-responsive, differential expansion actuator which has a minimum number of parts. The apparatus gives directly a highly amplified movement responsive to slight changes in temperature. It will not change its calibration with use, and always returns to the same initial position when temperature returns to normal. Furthermore, the actuator is not damaged by temperatures far from those under which it normally operates, ordinarily requires no adjustment, and operates satisfactorily with a minimum of maintenance.

According to the invention, the actuator comprises two connected elongated members which expand and contract differentially and which are specially formed and related to one another. One member is stiffened against bending over the major portion of its length and has a projection extending beyond one of its ends to which it is connected by an unstiffened junction. The other elongated member, sometimes termed the rod, is connected at one end to the projection on the first member and is connected at its other end to the opposite end of the first member in spaced relationship thereto. Thus, the second member or rod is positioned at an angle to the first and its connection thereto is displaced from one of its ends.

From the foregoing, it will be apparent that differential expansion of the first and second elongated members will turn the projection extending beyond the first member about its unstiffened junction therewith. Furthermore, by connecting the end of the second member to the projection near its flexible junction with the first member, upon differential expansion and contraction of the two elongated members the outer end of the projection moves many times farther laterally of the axis than the point of connection moves axially, giving substantial movement in response to slight variations in temperature and a high amplification of the relative movement between the elongated members.

The invention will best be understood from the following description of the present preferred embodiments thereof, read inconjunction with the drawings, in which:

Fig. 1 is a side elevation of one form of thermo-responsive, differential expansion actuator according to the invention;

Fig. 2 is a top view of the actuator illustrated in Fig. 1;

Fig. 3 is a broken side elevation of the same actuator, viewed from the right as seen in Fig. 1;

Figs. 3a through 3e illustrate various forms of connections between the projection on the stiffened member and the inner elongated member or rod;

Fig. 4 is a side elevation of a variant form of the actuator illustrated in Figs. 1, 2 and 3 which has resistance heating means thereon;

Fig. 5 is an enlarged broken mid-section of the bottom end of the actuator illustrated in Fig. 1, showing the relative fixation of the two members of the actuator at that end;

Fig. 6 is an enlarged broken elevation of the bottom of an actuator similar to that shown in Figs. 1, 2 and 3 but having a modified form of relative fixation of the same two members;

Fig. 7 is a broken elevation showing a further modification of the bottom end connection of the two members;

Fig. 8 is a perspective view of a channel form of thermal actuator according to the invention;

Fig. 9 is a perspective view of a variant form of the actuator illustrated in Fig. 8;

Fig. 10 is a side elevation, shown partly in mid-section, of an actuator, generally similar to that illustrated in Figs. 1, 2 and 3, coupled to a snap switch mechanism and positioned to operate it;

Fig. 11 is a front view of the snap switch mechanism shown in Fig. 10 removed from its housing; and Fig. 12 is a view similar to the upper portion of Fig. 10 but showing a slow action switch embodying the invention.

In Figs. 1, 2 and 3, there is shown a thermo-responsive, differential expansion actuator 15 comprising two elongated members suitably connected together at their ends for inter-action under variations of temperature. One member 16 is stiffened against bending over the major portion of its length by being formed as a tube, and has a flap or projection 17 extending outwardly from one end beyond an unstiffened junction 18 therewith. The projection 17 is illustrated as a trough-like continuation of the tubular member 16 but may be flat or given any desired shape.

The flexible junction 18 may be integral with the member 16 and the projection 17, although such is not necessarily the case. As here shown, the material of the tube is merely cut away between the elongated member and its projection to provide the unstiffened junction. Thus the tube, the projection and the hinge can all be cheaply made from stock tubing by mere cutting.

The second elongated member is formed as a rod 19, and is operatively connected at one end to the projection 17 in such manner as to provide for a certain amount of flexibility at that point, as hereinafter more particularly described. The rod 19 is connected to the opposite or bottom end of the tubular member 16 in spaced relation to its wall. This, as shown in Figs. 3, 5 and 10, is effected by fixing a block or plug 20 in the bottom of the tube and by firmly attaching centrally thereof the end of the rod 19 opposite to that which extends through the open end of the tube and is attached to the projection 17. This may be done by brazing or welding.

Obviously, the elongated member 19 need not be formed as a rod; but any appropriate cross-section may be given this member which is sufficiently stiff in compression.

It will be evident that differential expansion between the tubular member 16 and the rod 19 will cause the projection 17, which extends outwardly from the tubular member, to move angularly with respect to the latter. By fastening the rod end to the projection 17 closely adjacent the unstiffened junction 18, the path of movement of the outer end of the projection may be greatly magnified. The translation of substantially axial movement between the tube and the rod gives greatly amplified lateral movement of the end of the projection in any case.

It is preferred to form the tubular member 16 and the rod 19 of metals having different coefficients of thermal expansion. By so doing, there is a greater differential between the expansion and contraction of the two members and greater movement of the projection 17 is realized. In some applications, however, the rod and tube may be of the same metal, movement being produced by differential heating.

The lower end of the rod 19 need not be fixed in a plug at the bottom of the tubular member. It is possible, for example, to pinch the rod end centrally of the bottom of the tube by oppositely compressing and flattening the tube end, as illustrated in Fig. 6. The rod end may then be firmly held in place by means of a rivet 21 or by welding or brazing and may be flattened for insertion between the tube walls. In Fig. 7 the tube end is shown as drawn down to a neck 22 which closely fits the rod end and is welded or brazed thereto.

Various modes of connecting rod 19 to projection 17 are possible, some of which are shown in the drawings. As shown in Figs. 1, 2, 3, 3a and 4, the end of the rod may be flattened at 23 and secured by a rivet 24. The rivet may be replaced by a spot weld or other type of welded connection. The flattening of the rod end gives it sufficient flexibility for most applications. If greater flexibility is desired the structure of Fig. 3b may be used wherein rod 19 is attached to a spring blade 26 by welding 28, the blade being riveted or welded to projection 17. Still greater flexibility may be obtained by the structure of Fig. 3c wherein the end of the rod 19 is flattened in a direction at right angles to that shown in Fig. 3a and perforated to receive a rod 20 which is welded at its ends to flap 17, the latter being perforated at 30 to clear the end of the rod. In all of these structures the connection of the rod to the projection or flap is rigid and these two members necessarily move together. Where it is desired to provide for movement of the flap only after considerable relative movement of the rod and tube, as for example only after there has been a considerable temperature rise, the structure of Figs. 3d and 3e may be used. Here flap 17d has an aperture 31 the lower edge of which is overlapped by the edge of a head 19d on the rod which is held in place by folding the sides 32 of the flap around it. At room temperature the head may have clearance with the edge of aperture 31 which it does not engage, to move the flap, until after a predetermined rise in temperature.

A special purpose actuator is illustrated in Fig. 4. Here a tubular member 16a, of the general type illustrated in Figs. 1 to 3, is connected at its bottom, in the manner illustrated in Fig. 6, to one end of the rod 19, the other end of which extends through the open end of the tube and is connected to the projection 17, all as above described. The outer surface of the tubular member 16a is provided with a layer of insulation in any desired manner. A coil 25 of resistance wire may be wound on the insulation, and the actuator responds to the heat produced by the coil 25. Since there is no movement of the tube, the resistance winding is not disturbed.

Fig. 8 illustrates a thermo-responsive, differential expansion actuator in the form of a surface thermostat. This actuator is designed to make substantial contact with a surface which is subject to varying temperature and to reflect such variations by producing movement in its end portion which can be utilized for indicating, switching etc.

In the form illustrated in Fig. 8, one elongated member 15b is tiffened against bending over the major portion of its length through being formed as a channel with side walls 16b. The elongated member 15b has a projection 17b provided by extending the channel beyond an unstiffened junction 18b formed by notching both flanges of the channel down to its web. The flanges of the projection are shown as of reduced extent at right angles to the web. A second elongated member, in the form of a rod 19b, is shown as connected at one end by a rivet 24b to the projection 17b, and at its other end centrally of a block 20b fixed at the opposite end of the channel to the web and between its flanges. Like the block or plug 20 shown in Figs. 1 to 3 and 5, the block 20b stands substantially at right angles to the stiffened elongated member, and the rod 19b is fixed therein in spaced relation to the end of the member. Differential expansion and contraction between the two elongated members 15b and 19b moves the projection 17b in the same manner as the projection 17 in the embodiment illustrated in Figs. 1, 2 and 3.

Fig. 9 shows a similar actuator, wherein an elongated member 15c is formed as a channel having a bottom 16c. The other elongated member is here provided in duplicate as a pair of rods 19c, 19c, each pivotally connected to a flange of the projection 17c which extends beyond one end of the elongated member 15c, and each connected at its other end to a coplanar flange of the elongated member at its opposite end. Thus, the elongated member represented by the rods 19c, 19c is effectively connected in spaced relationship to the last-named end of the channel 15c.

Figs. 10 and 11 illustrate the use of the invention to operate a snap switch 44 such as that disclosed in Patent No. 2,630,504, granted March 3, 1953, to Lyndon W. Burch and Hadley K. Burch, for Motion Translating Device. As here shown, an actuator 15, like that illustrated in Figs. 1, 2 and 3, has its tubular member 16 fixed at its open end in a mounting plate 45. A housing 46 is fixed to the face of the plate 45 opposite to that from which the tubular member 16 projects, and the snap switch 44 is positioned in the housing. The projection 17 extending outwardly from the end of the tubular member and its unstiffened junction are positioned within the housing. The rod 19 also projects through the open end of the tubular member 16 into the housing, where the rivet 24 fixes it to the projection 17. Thus, the projection 17 is moved within the housing about its unstiffened junction 18 with the tubular member 16 as the latter and the rod 19 expand and contract differentially.

The longitudinal edges of the projection 17 are, in this case, turned away from the connection between the projection and the rod 19 to form a channel for accommodation of a connected actuating apparatus. As here shown, the actuating apparatus comprises a block of insulation 47 held by a screw 48 in the channel. Adjustably threaded through the block of insulation 47 is an actuating stem 49 positioned to press upon the snap action motion translating element 50 of the switch 44 to operate the latter. A hole 51 is provided in the housing 46 through which the rear end of the actuating stem protrudes. Provision is thereby made for adjusting the stem 49 in the block of insulation without removing the housing.

Accordingly, a temperature change which shortens the rod 19 with respect to the tube 16 turns the projection 17 toward the switch 44 and causes the actuating stem to bear upon the motion translating element which snaps it from one position to another. Conversely, a temperature change which elongates the rod 19 with respect to the tube 16 turns the projection 17 away from the switch and permits the stored energy of its motion translating element 50 to snap it in the opposite direction.

Obviously, other types of switch might replace the particular type here illustrated, and might be suitably operated by the described motion of the projection 17. Fig. 12 shows a slow acting switch mounted in a manner similar to the switch of Fig. 10 on plate 45. Here a housing 60, secured to the plate, encloses the flap 17 to which a contact 61 is secured by an insulating grommet 62, a flexible wire 64 connecting the contact to a terminal screw 65. An adjustable fixed contact in the form of a screw 66 threaded through a split plate 68 is electrically connected to another terminal screw 69. Temperature change applied to tube 16 causes movement of flap 17 to make or break a circuit connected to terminals 65 and 69.

From the foregoing, it will be recognized that the present invention provides a thermo-sensitive, differential expansion actuator which is simple and inexpensive. The actuator is dependent for its operation upon a minimum number of parts, and gives a direct, highly amplified movement responsive to slight changes in temperature. The apparatus will not change its calibration with use because of the simplicity and direct action of its parts; and, for the same reason, requires a minimum of maintenance.

The forms of the invention here described and illustrated are presented merely as examples of how the invention may be embodied. Other forms, embodiments and applications of the invention, coming within the proper scope of the appended claims, will readily suggest themselves to those skilled in the art.

What is claimed is:

1. A differential expansion actuator comprising an elongated member stiffened against bending over the major portion of its length and having a projection extending outwardly therefrom beyond an unstiffened junction therewith, and a second elongated member having one end portion connected to the projection beyond said unstiffened junction with respect to the opposite end portion of the second member and having its said opposite end portion fixed adjacent the opposite end of said first-named member, said one end portion of the second member meeting said projection at an angle thereto.

2. A differential expansion actuator according to claim 1 wherein said first-named elongated member and the projection extending outwardly therefrom are integral.

3. A differential expansion actuator comprising an elongated member stiffened against bending over the major portion of its length and having a projection extending outwardly therefrom beyond an unstiffened junction therewith, a block fixed to the other end of said elongated member, and a second elongated member having one end portion connected to the projection beyond said unstiffened junction with respect to the opposite end portion of the second member and having its said opposite end portion fixed to said block, said one end portion of the second member meeting said projection at an angle thereto.

4. A differential expansion actuator comprising an elongated member stiffened against bending over the major portion of its length and having an integral projection extending outwardly therefrom beyond an unstiffened junction therewith, a block fixed to the other end of said elongated member, and a rod having one end portion connected to the projection beyond said unstiffened junction with respect to the opposite end portion of the rod and having its said opposite end portion fixed to said block, said one end portion of the rod meeting said projection at an angle thereto.

5. A differential expansion actuator comprising a tube having a projection extending outwardly from one end thereof beyond an unstiffened junction therewith, and an elongated member having one end portion connected to the projection beyond said unstiffened junction with respect to the opposite end portion of the member and having its said opposite end portion fixed adjacent the opposite end of said tube, said one end portion of the member meeting said projection at an angle thereto.

6. A differential expansion actuator comprising a tube having a projection extending outwardly from one end thereof beyond an unstiffened junction therewith, and an elongated member positioned in said tube, said elongated member having one end portion connected to the projection beyond said unstiffened junction with respect to the opposite end portion of the member. and having its said opposite end portion fixed adjacent the opposite end of said tube, said one end portion of the member meeting said projection at an angle thereto.

7. A differential expansion actuator comprising a tube having a projection extending outwardly from one end thereof beyond an unstiffened junction therewith, and an elongated member positioned in said tube connected at one end to the projection on said tube and connected at its other end to the opposite end of said tube in spaced relation to the wall thereof, said tube and the projection extending outwardly from its end being integral.

8. A differential expansion actuator comprising a tube having a projection extending outwardly from one end thereof beyond an unstiffened junction therewith, a block fixed in the other end of said tube, and a rod having one end portion connected to the projection beyond said unstiffened junction with respect to the opposite end portion of the rod and having its said opposite end portion fixed to said block, said one end portion of the rod meeting said projection at an angle thereto.

9. A differential expansion actuator comprising a tube having a projection extending outwardly from one end thereof beyond an unstiffened junction therewith, and a rod connected at one end to the projection on said tube and rigidly connected at its other end between oppositely compressed and flattened end portions of the tube wall in spaced relation to the uncompressed wall of said tube.

10. A differential expansion actuator comprising a tube having a projection extending outwardly from one end thereof beyond an unstiffened junction therewith, a block fixed in the other end of said tube, and a rod connected at one end to the projection on said tube and connected at its other end to said block in spaced relation to the wall of said tube, the longitudinal edges of the projection on said tube being turned to form a channel for accommodation of a connected actuating apparatus movable by differential expansion and contraction of said tube and said rod.

11. A differential expansion actuator comprising a tube having a projection extending outwardly from one end thereof beyond an unstiffened junction therewith, the longitudinal edges of the projection on said tube being turned to form a channel, a block fixed in the other end of said tube, a rod connected at one end to the projection on said tube and connected at its other end to said block in spaced relationship to the wall of said tube, and an actuating apparatus fixed in the channel formed by the projection on said tube, in combination with a switch positioned in the path of movement of said actuating apparatus for operation thereby upon differential expansion and contraction of said tube and said rod.

12. A thermo-responsive, differential expansion actuator comprising a tube having an open end and an integral flap extending beyond that end, a plug closing the opposite end of the said tube, and a rod extending through the open end of said tube fixed to the flap on said tube and fixed at its opposite end to said plug in displaced relation to the wall of said tube, whereby temperature changes differentially expand and contract said tube and said rod to turn the flap with respect to the axis of said tube.

13. A differential expansion actuator comprising an elongated member of channel section having a projection extending outwardly from one end thereof beyond an unstiffened junction therewith, a block fixed in the other end of said member, and a rod having one end portion connected to the projection beyond said unstiffened junction with respect to the opposite end portion of the rod and having its said opposite end portion connected to said block, said one end portion of the rod meeting said projection at an angle thereto.

14. A differential expansion actuator comprising an elongated member of channel section having a projection of channel section extending outwardly from one end thereof beyond an unstiffened junction therewith, a block fixed in the other end of said member, and a rod having one end portion connected to the web of the projection beyond said unstiffened junction with respect to the opposite end portion of the rod and having its said opposite end portion connected to said block, said one end end portion of the rod meeting said projection at an angle thereto.

15. A differential expansion actuator comprising an elongated member of channel section having a projection of channel section extending outwardly from one end thereof beyond an unstiffened junction therewith, the flanges of the projection on said member being substantially coplanar with the flanges of said member and extending in like direction from its web, and two rods each connected at one end to a flange of the projection extending from one end of said member and each connected to a coplanar flange of said member adjacent its opposite end.

16. A thermo-responsive, differential expansion actuator comprising a tube having an open end, a closed end and an integral flap, said integral flap extending beyond said open end, and a rod extending through the open end of said tube, an end portion of said rod being connected to the flap on said tube beyond said open end with respect to the opposite end portion of the rod, said opposite end portion of said rod being fixed adjacent said closed end of the tube, and said one end portion of said rod meeting said flap at an angle thereto, whereby temperature changes differentially expand and contract said tube and said rod to turn the flap with respect to the axis of the tube.

17. A differential expansion actuator comprising an elongated member stiffened against bending over the major portion of its length and having a projection extending outwardly therefrom beyond an unstiffened junction therewith, and a second elongated member having one end portion connected to the projection beyond said unstiffened junction with respect to the opposite end portion thereof and having its said opposite end portion fixed adjacent the opposite end of said first-named member; said second elongated member, including said one end portion, lying at an angle to said projection.

18. A differential expansion actuator according to claim 1 wherein said one end portion of the second member is immovably connected with respect to said projection and wherein said second member includes a portion of reduced thickness to permit flexure of the last-mentioned portion upon movement of the projection about said unstiffened junction.

References Cited in the file of this patent

UNITED STATES PATENTS

| | | |
|---|---|---|
| 2,392,065 | Rodgers | Jan. 1, 1946 |
| 2,516,502 | Altman et al. | July 25, 1950 |
| 2,627,565 | Smith | Feb. 3, 1953 |